UNITED STATES PATENT OFFICE.

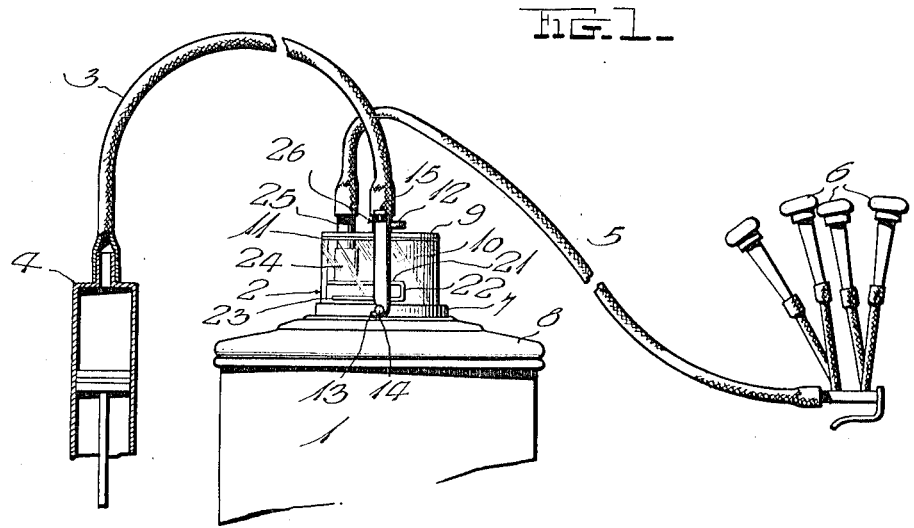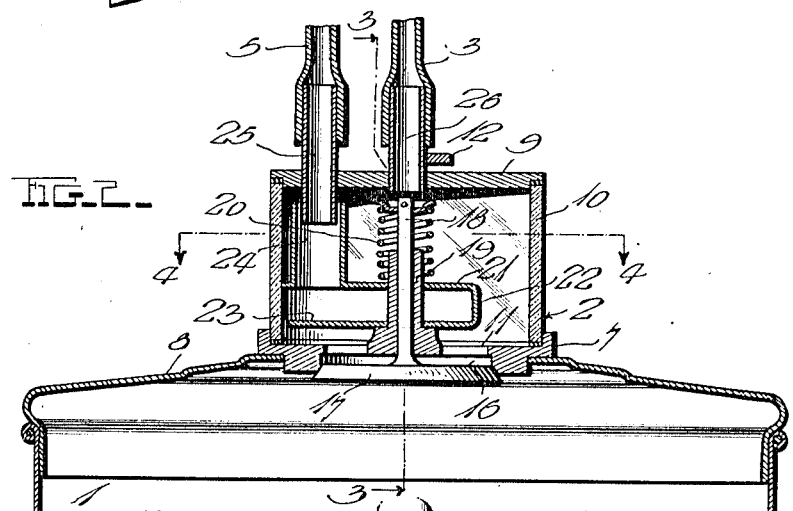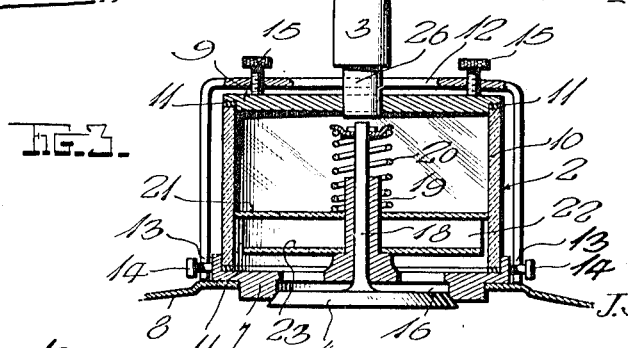

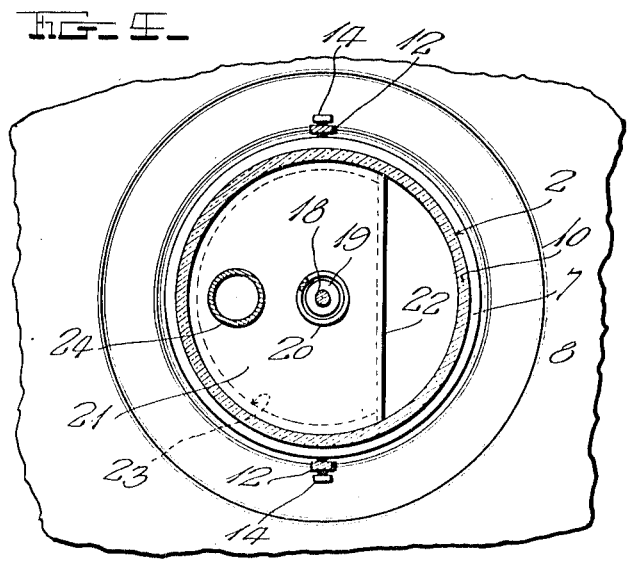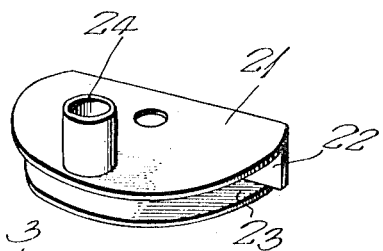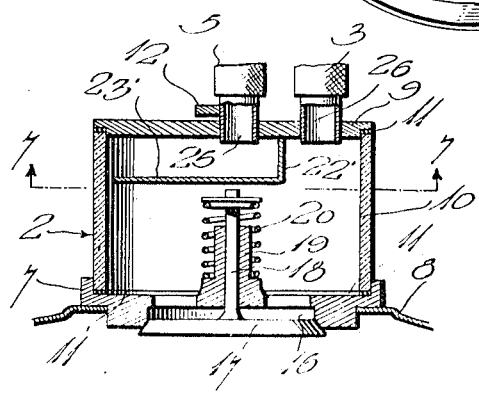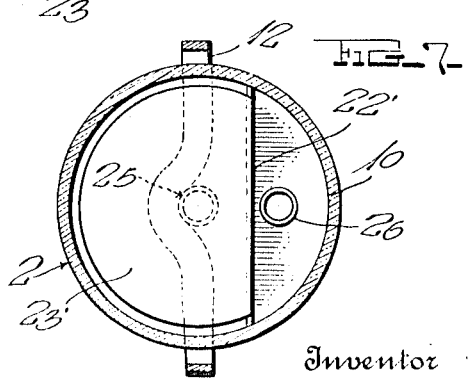

JOHN S. BUCKWALTER, OF LANCASTER, PENNSYLVANIA.

MILKING-MACHINE.

1,309,457. Specification of Letters Patent. Patented July 8, 1919.

Application filed July 24, 1918. Serial No. 246,545.

*To all whom it may concern:*

Be it known that I, JOHN S. BUCKWALTER, a citizen of the United States, residing at Lancaster, in the county of Lancaster and State of Pennsylvania, have invented certain new and useful Improvements in Milking-Machines; and I do declare the following to be a full, clear, and exact description of the invention, such as will enable others skilled in the art to which it appertains to make and use the same.

My invention has for its primary object to provide a simply constructed yet efficient and reliable vacuum chamber for milking machines, having a transparent wall through which the volume of milk drawn on each intermittent suction stroke of the vacuum pump may be viewed at all times, whereby it may be readily ascertained whether or not the apparatus is properly operating, and at the same time have a chamber that may be readily detached and taken apart for cleaning purposes.

With the foregoing and other objects in view, the invention resides in the novel features of construction and unique arrangement and combinations of parts to be hereinafter fully described and claimed, the descriptive matter being supplemented by the accompanying drawings which form a part of this specification.

Figure 1 is a side elevation showing the invention applied.

Fig. 2 is an enlarged vertical section through the vacuum chamber.

Figs. 3 and 4 are respectively vertical and horizontal sections on the planes indicated by the lines 3—3 and 4—4 respectively of Fig. 2.

Fig. 5 is a perspective view of the partition and baffle plate shown in the preceding figures.

Fig. 6 is a vertical section showing a different form of construction.

Fig. 7 is a horizontal section on the plane of the line 7—7 of Fig. 6.

In the drawings above briefly described, the numeral 1 designates the milk container, 2 the vacuum or valve chamber, 3 the suction line leading from said chamber to the pump 4, and 5 designates the milk tube extending to the suction chamber from the teat cups 6. This general arrangement is well known and need not be described in detail, since the present invention resides in the vacuum chamber 2.

The chamber in question comprises a flanged metal bottom 7 carried by the top 8 of the container 1, a metal top 9, an annular wall 10 between said top and bottom preferably made of glass or transparent material, gaskets 11 interposed between the end of the wall and said top and bottom, and a yoke 12 passing over the top 9 with its arms depending therefrom and provided with hooks 13 engaging studs 14 on the bottom 7. One or more set screws 15 are threaded through the crown bar of the yoke and bear against the top 7 so as to hold the top, bottom and side wall tightly together. Loosening of the set screws, however, permits the vacuum chamber to be quickly disassembled for washing and sterilizing. Other fastening means may be substituted to detachably unite the top, wall and bottom.

The bottom 7 is provided with an outlet opening 16 having a valve seat against which a puppet valve 17 seats, said valve having a vertical stem 18 slidable in a guide boss 19 rising from the aforesaid bottom, a coiled spring 20 being provided to normally close the valve but to permit opening of said valve when sufficient milk has accumulated in the vacuum chamber to overcome the spring resistance. Said spring seats at its upper end against a readily removable shoulder in the form of a washer on the valve stem as shown in Fig. 2.

The features so far described are common to both forms of my invention, whereas Figs. 1 to 5 illustrate certain other features and Figs. 7 and 8 disclose modifications thereof. The form of the device first illustrated will now be described.

A metal partition 21 of substantially circular segmental shape extends across approximately three-quarters the cross sectional area of the chamber 2 and is provided with an opening in which the upper end of the valve stem guide boss 19 is received. The curved edge of partition 21 contacts snugly with the wall 10 while a vertical flange 22 depends from the straight edge of the partition and extends entirely across the chamber 2. The straight edge of a substantially circular segmental deflector plate 23 is joined to the lower edge of flange 22, the curved edge of said deflector plate being spaced from the wall 10 sufficiently to permit the free passage of milk from the plate into the bottom of the suction chamber. The partition 21 is provided with a sleeve 24 into which the nipple 25 extends from the top 9, said nipple also serving as the attaching means for the milk supply tube 5 as shown, for instance, in Fig. 2. The sleeve 24 loosely receives the nipple 25 so that a vent is provided for the line leading to the teat cups. A similar nipple 26 is provided for the attachment of the suction tube 3, and the partition 21 and flange 22 serve as means to prevent the milk from being drawn through said nipple 26 from the plate 23, causing the milk to flow downwardly between the edge of the plate and the glass wall 2. The deflector plate is likewise apertured to receive the valve stem guide 19, such plate, the flange 22 and the partition 21 being integrally formed and readily removable from said guide or boss 19 when the spring 20 is removed from the valve stem.

In the form of the device shown in Fig. 6, a substantially circular segmental shaped deflector plate 23' is located under the milk supply nipple 25 and is provided with an upstanding flange 22' joined to the top 9 of the chamber 2 between said nipple 25 and the nipple 26 to which the suction line 3 is connected. The curved edge of the plate 23' is spaced from the glass wall 10 so as to force the milk to flow therebetween. In both forms of the invention, the plates 23 and 23' perform the function of preventing the suction from drawing the milk out of the vacuum chamber before it is deposited in the bottom of the latter. In either form, the rise and fall of milk in the chamber may be readily seen through the glass wall and consequently it may be ascertained whether or not the apparatus is properly operating.

Since probably the best results are obtained from the details as shown and described, they are by preference followed, but within the scope of the invention as claimed, considerable latitude is allowed for making such changes as occasion may dictate.

I claim:

1. In a milking machine, a chamber having a milk outlet in its lower end and provided with a milk inlet and a suction port in its upper end, together with a horizontal segmental plate extending across said chamber below said milk outlet with its curved edge spaced from the wall of the chamber, and means joined to the straight edge of said plate to prevent the milk discharged thereon from leaving said plate except by passage between said curved edge and the wall of said chamber.

2. In a milking machine, a chamber having a milk outlet in its lower end and provided with a milk inlet and a suction port in its upper end, said inlet extending eccentrically into said chamber, a segmental partition extending across substantially three fourths of said chamber and having an opening through which said milk inlet discharges, a flange depending from the straight edge of said partition, and a segmental deflector plate extending horizontally from said flange below said partition with its curved edge spaced from the chamber wall.

3. In a milking machine, a valve chamber having an outlet in its lower end and provided with a milk inlet and a suction port in its upper end, said inlet extending eccentrically into said chamber, a segmental partition extending approximately three quarters across said chamber, a flange depending from the straight edge of said partition, a segmental deflector plate extending horizontally from said flange below said partition with its curved edge spaced from said chamber wall, and a tube rising from said partition and loosely receiving the lower end of said milk inlet, said tube communicating with the space between said partition and deflector plate.

4. In a milking machine, a valve chamber having an outlet in its lower end and a valve stem guide rising from said end, a valve to control said outlet and having a stem slidable through said guide, said chamber being also provided with a milk inlet and a suction port in its upper end, a segmental partition extending across said chamber below said outlet and having an opening through which the milk from said milk inlet discharges, a flange depending from the straight edge of said partition, a segmental deflector plate extending horizontally from said flange below said partition with its curved edge spaced from the chamber wall, said partition and deflector plate being formed with openings to receive said valve stem guide, a coiled spring surrounding said stem and guide and having one end seated on said partition and a shoulder on said valve stem engaged by the other end of said spring.

5. In a milking machine, a top, a bottom, and a side wall formed separately and having gaskets therebetween, and means for securing said top, bottom and wall detachably together; together with a milk inlet in said top, a segmental plate carried by said bottom with its curved edge spaced from said wall, and means joined to the straight edge of said plate to prevent the milk discharged thereon from leaving the plate except by passage between its curved edge and said wall.

6. In a milking machine, a valve chamber comprising a bottom, a top, and a side wall between them, gaskets between said wall and said top and bottom, studs extending laterally from said bottom, a yoke extending over said top and having hooks on its arms engaging said studs, and a set screw threaded through the crown of said yoke and bearing against said top, said top having a suction port and a milk inlet, and said bottom having a milk outlet.

7. In a milking machine, the combination of a valve chamber comprising a bottom having a valve controlled milk outlet, a top having a milk inlet and suction port, a transparent body portion separating said bottom and top and separable therefrom, gaskets between the ends of said body portion and said bottom and top, means for detachably securing said parts together and a milk deflecting device arranged in the valve chamber adjacent the milk inlet.

8. In a milking machine, a valve chamber comprising a bottom, a top and a transparent body portion separating the two and detachable therefrom, gaskets between the ends of the said body portion and the bottom and top, means for detachably securing said parts together, said bottom having a milk outlet and a centrally arranged valve stem guide rising into said chamber, a spring actuated valve for said outlet having its stem slidable in said guide, said top having a suction port, and a milk inlet, and a milk guiding and deflecting device removably arranged on said valve stem guide and supported thereby to receive the milk from said inlet.

In testimony whereof I have hereunto set my hand.

JOHN S. BUCKWALTER.